United States Patent [19]
Tashiro

[11] Patent Number: 5,967,025
[45] Date of Patent: Oct. 19, 1999

[54] APPARATUS FOR CUTTING AND SHAPING A SPHERICAL BODY

[75] Inventor: Yasunori Tashiro, Utsunomiya, Japan

[73] Assignee: Rheon Automatic Machinery Co., Ltd., Tochigi-ken, Japan

[21] Appl. No.: 08/937,395

[22] Filed: Sep. 25, 1997

[30] Foreign Application Priority Data

Sep. 25, 1996 [JP] Japan ................................ 8-275448

[51] Int. Cl.⁶ .............................. A21C 3/10; A21C 9/06; A21C 11/00; A21D 8/00
[52] U.S. Cl. ...................... 99/450.2; 99/450.1; 99/450.6; 99/450.7; 425/132; 425/142; 425/287; 425/308
[58] Field of Search ................................ 99/494, 450.1, 99/450.2, 450.6, 450.7, 450.8, 353, 355, 516; 425/132, 142, 287, 308, 309, 466; 426/496, 499, 503, 516, 517; 264/167

[56] References Cited

U.S. PATENT DOCUMENTS

| | | | |
|---|---|---|---|
| 4,517,785 | 5/1985 | Masuda | 99/450.6 |
| 4,608,918 | 9/1986 | Funabashi et al. | 99/450.7 X |
| 4,692,109 | 9/1987 | Hayashi et al. | 425/308 |
| 4,734,024 | 3/1988 | Taashiro | 425/132 |
| 4,806,087 | 2/1989 | Hayashi | 99/450.6 |
| 4,832,961 | 5/1989 | Aoki | 99/450.7 |
| 4,883,678 | 11/1989 | Tashiro | 426/503 X |
| 5,081,917 | 1/1992 | Masuda | 99/450.2 |
| 5,098,273 | 3/1992 | Tashiro | 425/132 |
| 5,153,010 | 10/1992 | Tashiro | 425/287 |
| 5,156,869 | 10/1992 | Otsuki | 426/237 |
| 5,190,770 | 3/1993 | Tashiro | 425/142 X |
| 5,290,577 | 3/1994 | Tashiro | 99/450.6 |

FOREIGN PATENT DOCUMENTS

| | | |
|---|---|---|
| 5-9051 | 2/1993 | Japan . |
| 5-25432 | 6/1993 | Japan . |

*Primary Examiner*—Timothy F. Simone
*Attorney, Agent, or Firm*—Brinks Hofer Gilson & Lione

[57] ABSTRACT

An apparatus for cutting and shaping spherical products, such as filled dumplings, including a plurality of shutter members, each shutter member having first and second adjacent sliding surfaces and an elongated hole, a connecting member for slidably connecting adjacent shutters, and shafts equidistantly disposed on an imaginary circle which are received in the elonagated holes for slidably rotating the shutter members to thereby open and close a central opening.

7 Claims, 8 Drawing Sheets

1

APPARATUS FOR CUTTING AND SHAPING A SPHERICAL BODY

BACKGROUND OF THE INVENTION

1. Field of the Invention

This invention relates to an apparatus for shaping food products, in particular to an apparatus for cutting and shaping spherical food products, such as a bean-jam bun or bean-jam rice dumpling, from two-layered bar-shaped food material continuously extruded from an extruder.

2. Description of the Prior Art

A first conventional apparatus for cutting and shaping a bean-jam bun is disclosed, e.g., in Japanese Utility Model Publication No. 5-25432. This conventional apparatus includes at least three hexahedral plastic pieces, each hexahedral piece having two adjacent sliding side surfaces. The hexahedral pieces are combined into an assembly such that these sliding surfaces abut each other. The assembly is held in a polygonal housing so as to form a central opening surrounded by parts of the sliding surfaces, and the hexahedral pieces are made to slide on each other so as to open and close the central opening so that a dough bar passing therethrough is cut and shaped.

A problem with the first conventional apparatus disclosed in Japanese Utility Model Publication No. 5-25432 is that the plastic hexahedral pieces encased in the housing tend to expand and be clogged or burnt by heat generated during the operation, which thus must be discontinued.

A second conventional apparatus is disclosed, e.g., in Japanese Patent Publication No. 5-9051. This conventional apparatus includes identically-shaped polyhedral members which are pivoted on fulcrums equidistantly disposed on an imaginary circle surrounding a central opening. The polyhedral members are arranged such that each polyhedral member synchronously rotates on its respective fulcrum, while a tip of each polyhedral member tracks a side surface of an adjacent member, so as to open and close the central opening to cut and shape food material passing therethrough.

A problem with the second conventional apparatus disclosed in Japanese Patent Publication No. 5-9051 is that, other than at the tips of the polyhedral members, gaps are formed between the side surfaces of adjacent polyhedral members while the tips track the side surfaces of adjacent polyhedral members. This allows food material to enter the gaps so that the surfaces of the food material may be disfigured.

Another problem with the second conventional apparatus is that since only the tip portions of the polyhedral members touch the side surfaces of adjacent members, the tip portions eventually wear away so that the central opening cannot be completely closed. Therefore, the effects of cutting and shaping a spherical body are reduced.

SUMMARY OF THE INVENTION

The present invention avoids the problems associated with the prior art by providing an apparatus for cutting and shaping a spherical body from a bar-shaped dough comprising at least three shutter members, each of which having first and second sliding surfaces and an elongated hole provided in a central part of the member, wherein each member is pivotally and slidingly mounted on a shaft that is provided through the hole such that the first sliding surface of a shutter member tracks the second sliding surface of an adjacent member, thereby causing the first sliding surfaces to form a central opening which is opened and closed by the shutter members to cut and shape the bar-shaped dough passing through the central opening. The apparatus of the present invention is characterized by connecting members laid across adjacent shutter members, for connecting the adjacent shutter members such that the first sliding surface of a shutter member slidably contacts the second sliding surface of an adjacent shutter member to form a shutter assembly wherein the shutter members are slidably held to prevent clogging.

The connecting member of the present invention may be any type that makes adjacent shutter members slidingly contact each other without forming a gap therebetween. For instance, the connecting member may include a body portion fixed to one shutter member and a key-shaped portion slidingly engaged with a groove formed in an adjacent shutter member.

The elongated hole in the shutter member is provided parallel to the first sliding surface. A rotating shaft is fit in each elongated hole at a point equidistantly disposed on an imaginary circle, the total number of such shafts being equal to the number of shutter members. Because of this arrangement, the distance from the shaft to the tip of each shutter member varies so as to prevent the shutter members from being locked with each other.

There is no need for every shaft to be a drive shaft. Only one shaft needs to be a drive shaft, while the remaining shafts may be driven shafts or fulcrums that do not rotate.

Since the apparatus of the present invention does not require a housing to hold the shutter assembly, the shutter members will not cause clogging even when they expand by heat during the operation. Also, since in the present invention the side surfaces of adjacent shutter members always slidingly abut each other, no gap is formed therebetween for food material to enter.

DETAILED DESCRIPTION OF THE INVENTION

The present invention is described below with reference to the attached drawings.

Figure 1:
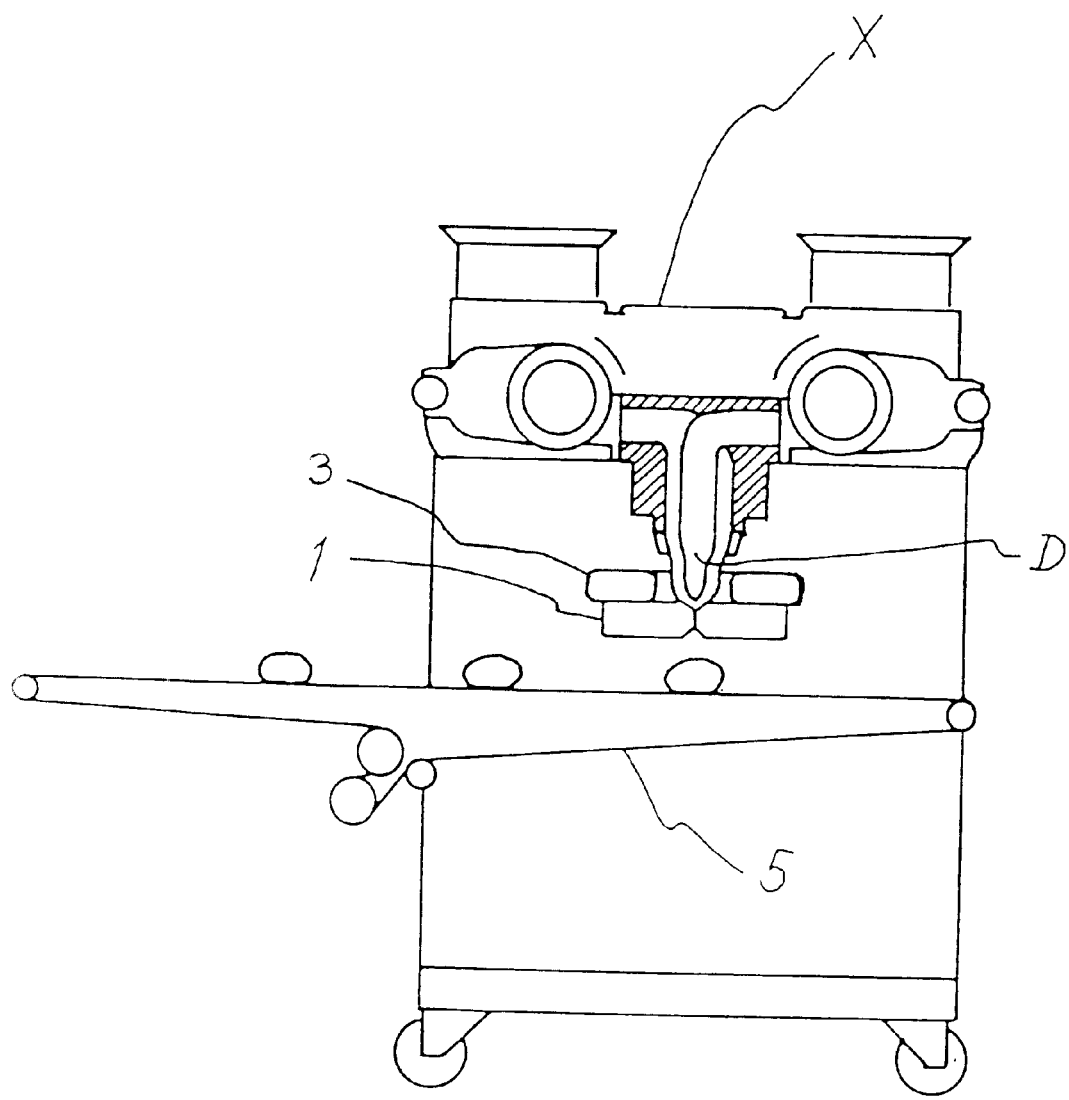
FIG. 1 is a schematic front view, partly in section, of an apparatus for cutting and shaping bar-shaped food material according to the present invention.
Figure 2:
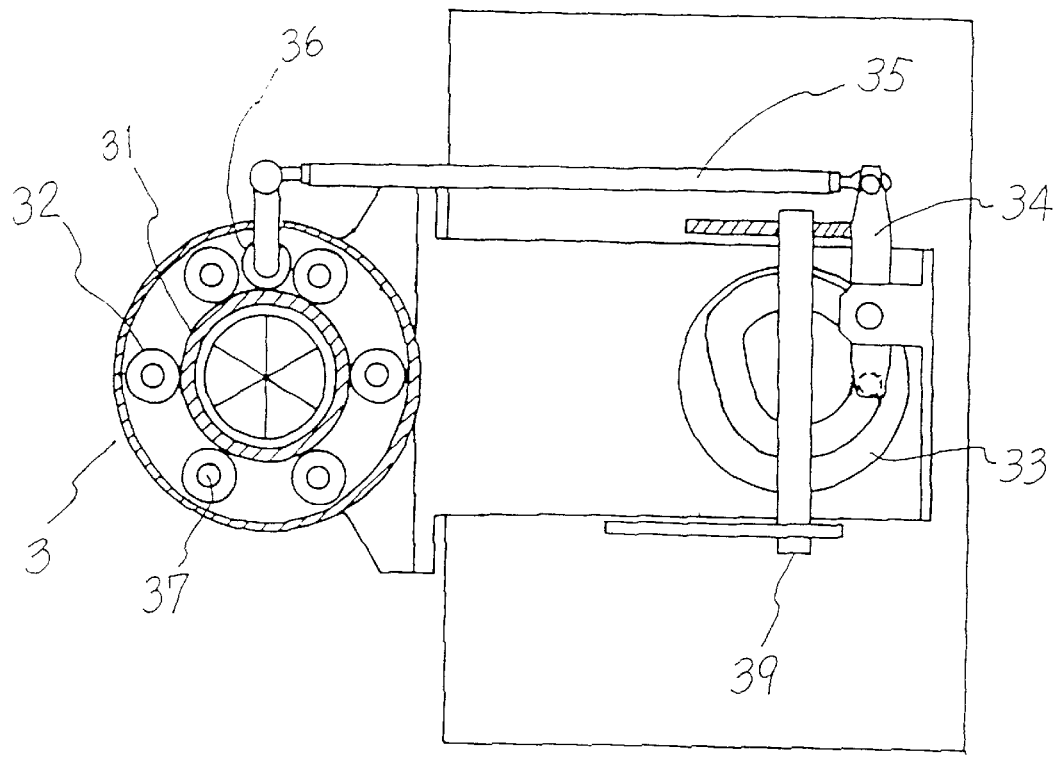
FIG. 2 is a schematic plan view, partly in section, showing a drive mechanism for driving shutter members of the apparatus shown in FIG. 1.
Figure 3:
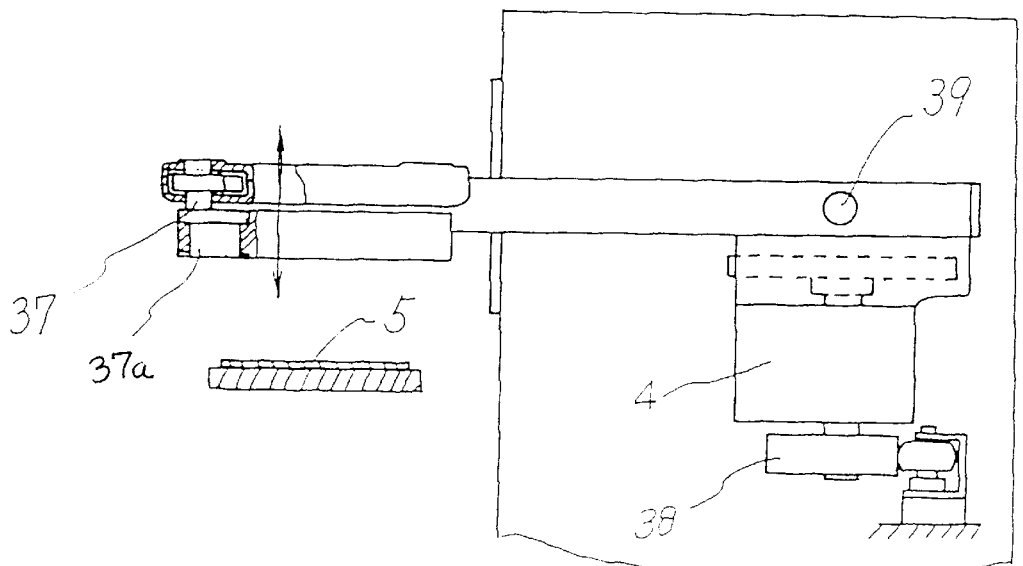
FIG. 3 is a schematic side view, partly in section, showing the drive mechanism shown in FIG. 2.

FIGS. 1–3 show an apparatus for cutting and shaping bar-shaped food material according to the present invention. Referring to FIG. 1, the apparatus includes an extruder assembly X for extruding a continuous bar-shaped food material D, a shutter assembly drive mechanism 3 for driving a shutter assembly 1 which cuts and shapes the extruded bar-shaped food material D to form food products, such as bean-jam buns or bean-jam rice dumplings, and a conveyor 5 disposed under the drive mechanism 3 for receiving the cut and shaped food products, and for conveying the food products to a subsequent processing area in a food production line.

In accordance with one embodiment of the present invention, extruder assembly X includes two separate extruders, one for extruding crust material in a tubular form, and one for injecting filling material into the tubular crust material to form the continuous bar-shaped food material D which is subsequently fed into a central opening 2 (FIG. 5) formed by the shutter assembly 1 disposed under the extruder assembly X.

Referring to FIGS. 2 and 3, the shutter assembly drive mechanism 3 includes a motor 4 which produces a rotary drive force transmitted to a ring gear 31 and gears 32 via a rotary cam 33, and arm 34 and a rod 35. The arm 34 includes a cam follower (not shown) which is received in a cam groove formed in the rotary cam 33. The arm 34 is pivoted relative to a frame so that the movement of the cam follower is transmitted to the arm 34, which alternately pulls and pushes the rod 35. The pulling and pushing action of the rod 35 is transmitted via a gear 36 to the ring gear 31, thereby causing the ring gear 31 to rotate. Rotation of the ring gear 31 is transmitted to the gears 32, which causes the rotation of a plurality of rotary shafts 37 (each of the rotary shafts 37 being connected to one of the gears 32). As described below, rotation of the rotary shafts 37 causes opening and closing of the shutter assembly 1, which causes the shutter assembly 1 to cut and shape bar-shaped food material D.

As shown in FIG. 3, the shutter assembly drive mechanism 3 further includes a cam 38, connected to the motor 4, for causing the drive mechanism 3 to pivot on a supporting shaft 39 such that the shutter assembly 1 moves up and down in the direction indicated by the double-headed arrow (that is, toward and away from the extruding assembly X). The cam 38 includes a cam groove in a spiral form such that the cam 38 is alternately raised and lowered by a cam follower as the cam 38 is rotated by the motor 4.

The conveyor 5, which is disposed under the shutter assembly 1, may be moved up and down in synchronism with the movement of the drive mechanism 3.

FIGS. 4–7 show a shutter assembly according to a first embodiment of the present invention. The shutter assembly of the first embodiment is constituted by a combination of six shutter members 6. All of the shutter members 6 have an identical shape.

Figure 8:
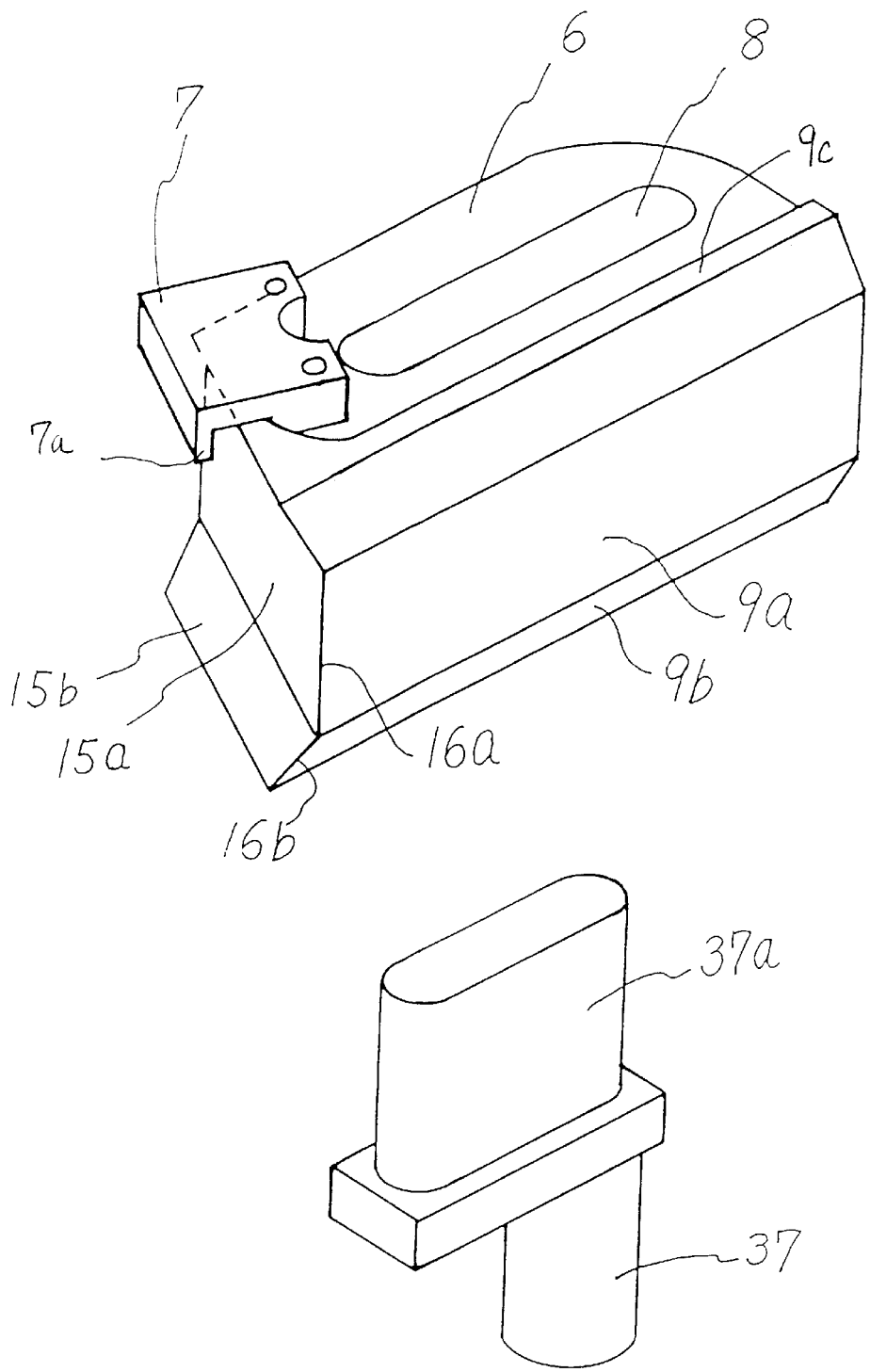
FIG. 8 is an exploded perspective view showing a shutter member and associated rotary shaft according to the first embodiment.

FIG. 8 shows a perspective view of one shutter member 6 according to the first embodiment. Each shutter member 6 includes a convex sliding surface 9 (formed by surfaces 9a and 9b), a concave sliding surface 15 (formed by surfaces 15a and 15b), and a tip 16 (formed by edges 16a and 16b) where the convex surface 9 meets the concave surface 15, so that a convex-concave engagement results between adjacent shutter members. Mounted on the top surface of each shutter member 6 is a connecting member 7 which includes an elongated rib 7a aligned parallel to the concave sliding surface 15. In addition, the top surface of each shutter member 6 includes an engaging ridge 9c which extends along the upper edge of the convex surface 9. When the shutter members 6 are combined to form the shutter assembly 1, the elongated rib 7a of a first shutter member 6 is mounted over and slidably engages the ridge 9c of a second shutter member 6, thereby maintaining the concave sliding surface 15 of the first shutter member 6 in sliding contact with the convex sliding surface 9 of the second shutter member 6. Each shutter member 6 also includes an elongated hole 8 which is aligned such that its longitudinal axis is parallel to the sliding surface 9.

Also shown in FIG. 8 is a portion of one of the rotary shafts 37 may include. Each rotary shaft 37 an elongated drive shaft 37a fixedly mounted thereon and shaped such that the drive shaft 37a fits into the elongated hole 8 formed in an associated shutter member 6.

Figure 4:
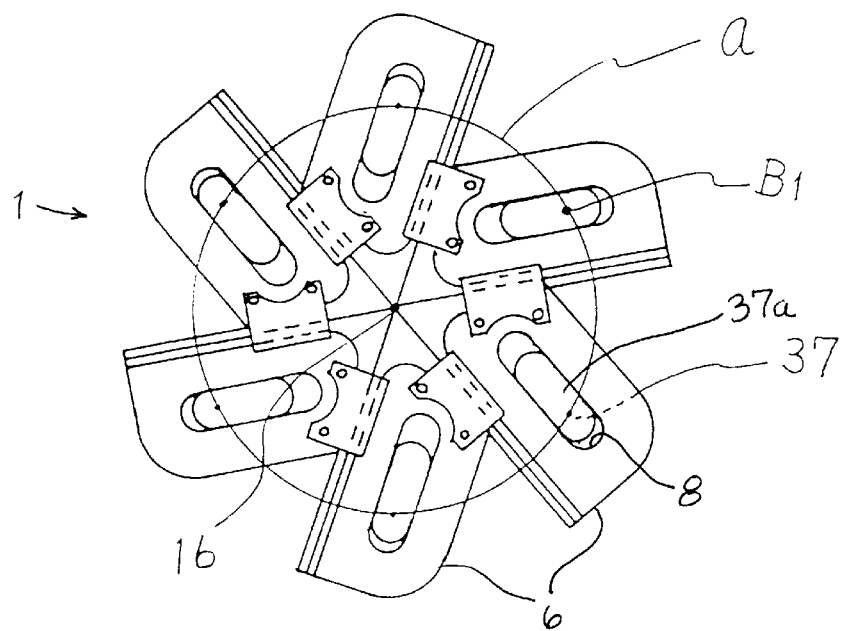
FIG. 4 is a plan view showing a shutter assembly of the apparatus according to a first embodiment of the present invention, wherein the shutter assembly is in a fully closed position.

Turning to FIG. 4, the rotary shafts 37 are pivotally mounted on six fulcrums B1 equidistantly disposed on an imaginary circle a along which the shutter assembly 1 is pivoted, and each drive shaft 37a is received in the elongated hole 8 of one of the shutter members 6. In addition, adjacent shutter members 6 are slidably connected by connecting members 7 so as to make the side surfaces of adjacent shutter members slidingly contact each other, and so as to prevent the shutter members 6 from being separated when they are rotated by the rotation of the shafts 37. Since the distance from the fulcrum B1 to the tip 16 can vary, the drive shafts 37a smoothly slide along the inside of the elongated hole 8 to open and close the central opening 2 (shown in FIG. 5). If no elongated hole 8 were provided in the shutter member 6, and if the shutter members were merely pivoted around shafts, the shutter members would not rotate smoothly since the rotation of the shutter members would be locked by their engagement with the shafts. The provision of the elongated hole 8 enables the drive shafts 37a to slidingly rotate the shutter members 6 to open and close the central opening 2.

Figure 5:
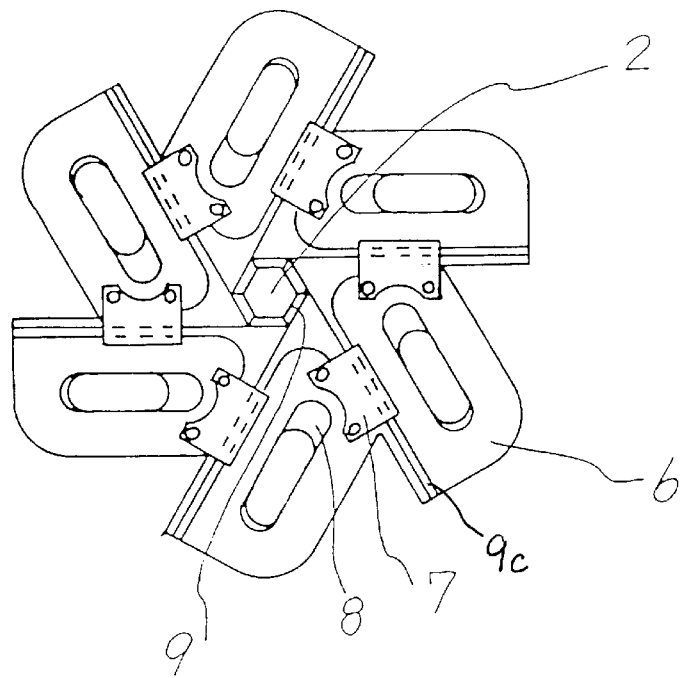
FIG. 5 is a plan view showing the shutter assembly according to the first embodiment, wherein a central opening formed by the shutter assembly is partially opened.
Figure 6:
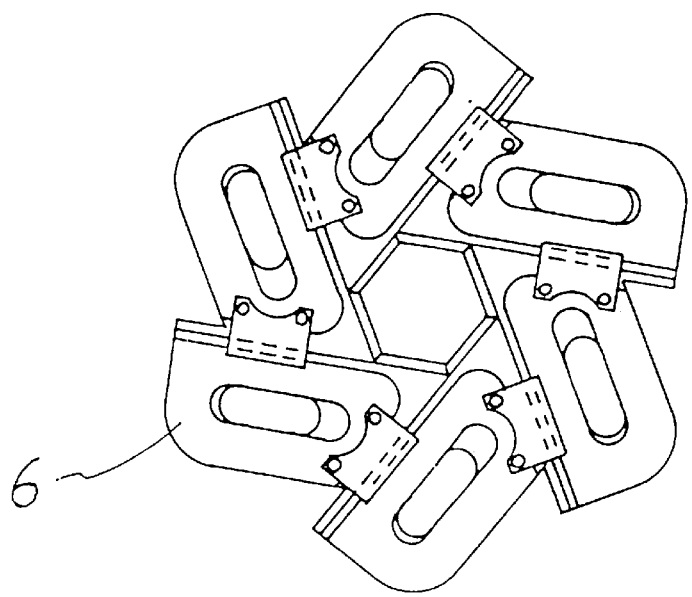
FIG. 6 is a plan view showing of the shutter assembly according to the first embodiment, wherein the central opening is further opened.
Figure 7:
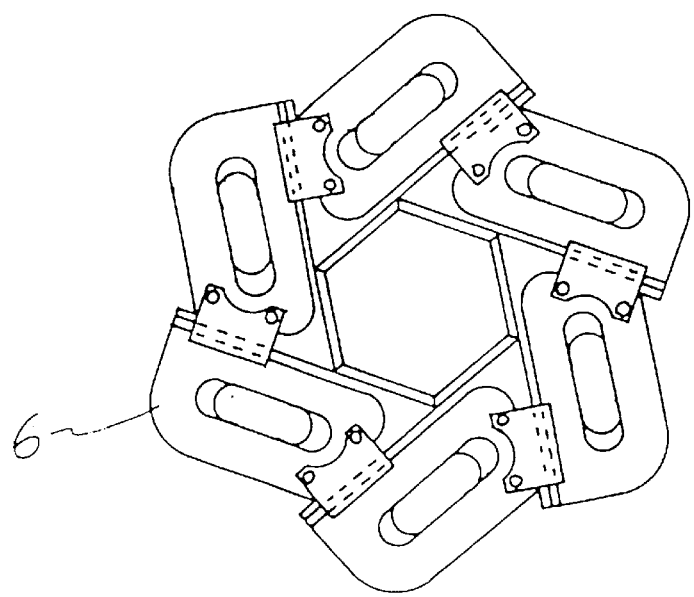
FIG. 7 is a plan view showing of the shutter assembly according to the first embodiment, wherein the central opening is fully opened.

FIG. 4 shows the shutter members 6 when the central opening 2 is closed. FIGS. 5–7 show the positions taken by the shutter members 6 at various states while the central opening 2 is being opened. As indicated in these figures, as the central opening 2 enlarges, the connecting member 7 of each shutter member 6 slides along the ridge 9c of an adjacent shutter member 6.

When the shutter member 6 are fully opened, a position of the shutter assembly 1 is adjusted such that a portion of the bar-shaped dough body extends through the central opening 2. At this time, the sliding direction of the shutter members 6 is reversed by the driving mechanism 3 such that the opening 2 is gradually closed. As the central opening 2 decreases, the sliding surfaces 9a of the cutting members 6 press the bar-shaped food material D such that the peripheral (crust) portion of the food material D is deformed inward to form a neck-like part. As the neck-like part is pinched together by the shutter members 6 so as to reduce its surface area, the filling material within the crust is pushed out of the neck-like part such that none of the filling is exposed during the subsequent cutting process. This function continues until the food material is cut by the edges 16a that meet at the center of the shutter assembly.

As the shutter members continue to rotate, the edges 16b further progress while contacting and crossing each other, until the rotating operation stops when the edges 16b are no longer visible (as shown in FIG. 4).

During this two-step cutting and shaping operation the shutter assembly can completely separate even very sticky dough material, and guide the crust of the cut product to its op portion.

FIGS. 9 through 12 show a shutter assembly according to a second embodiment of the present invention. In accordance with the second embodiment, each of the four shutter members 10 has an identical rectangular shape and includes a connecting member 11 which extends from an end surface thereof and has an engaging portion, a sliding surface 13 and a ridge 13a formed along the sliding surface 13. When connected to form a shutter assembly, the connecting member 11 slidably engages the ridge 13a of an adjacent shutter member 10, such that the sliding surface 13 of each shutter member 10 is maintained in sliding contact with an adjacent shutter member 10 in a manner similar to the first embodiment. Each cutting member 10 also includes an elongated hole 12 such that its longitudinal axis is parallel to the sliding surface 13. In the second embodiment, the drive mechanism 3 includes shafts 14 which are pivoted around fulcrums B2 provided at four equidistant points on an imaginary circle a. A drive shaft 14a may be provided on each shaft 14 and is received in the elongate hole 12 of one of the shutter members 10, and slidingly contacts the inside surface thereof.

When the shutter members 10 are rotated by the rotation of the shafts 14, since adjacent shutter members are slidably connected by the connecting members 11, the shutter members 10 are prevented from being separated. Since the distance from the fulcrum B2 to the tip 16 of the shutter member can vary, the drive shafts 14a can smoothly slide along the inside surface of the elongated hole 12 to open and close the central opening 2.

If no elongated hole 12 were provided in the shutter members 10, and if the shutter member were rotated by a shaft pivotally connected thereto without any elongated hole, the shutter member could not rotate, since the shaft would interfere with the shutter member. The provision of the elongated hole 12 enables the shaft to slidingly rotate to open and close the central opening 2.

Figure 9:
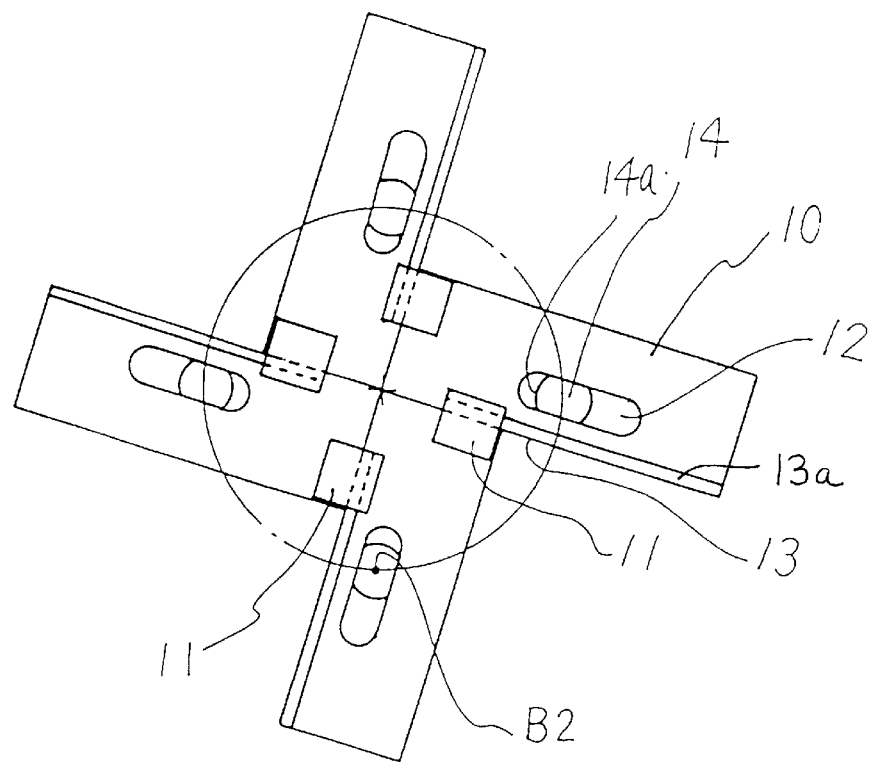
FIG. 9 is a plan view showing a shutter assembly of the apparatus according to a second embodiment of the present invention, wherein the shutter assembly is in a fully closed position.
Figure 10:
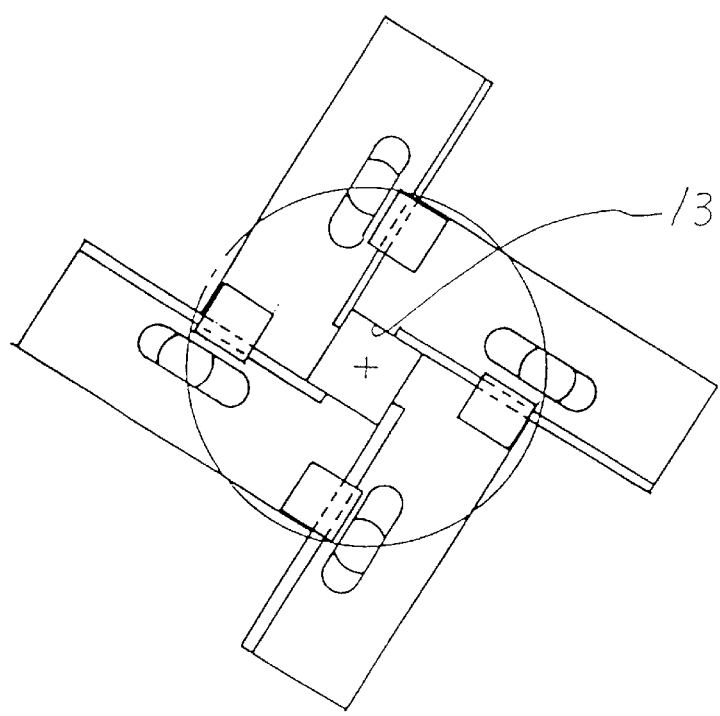
FIG. 10 is a plan view showing the shutter assembly according to the second embodiment, wherein a central opening formed by the shutter assembly is partially opened.
Figure 11:
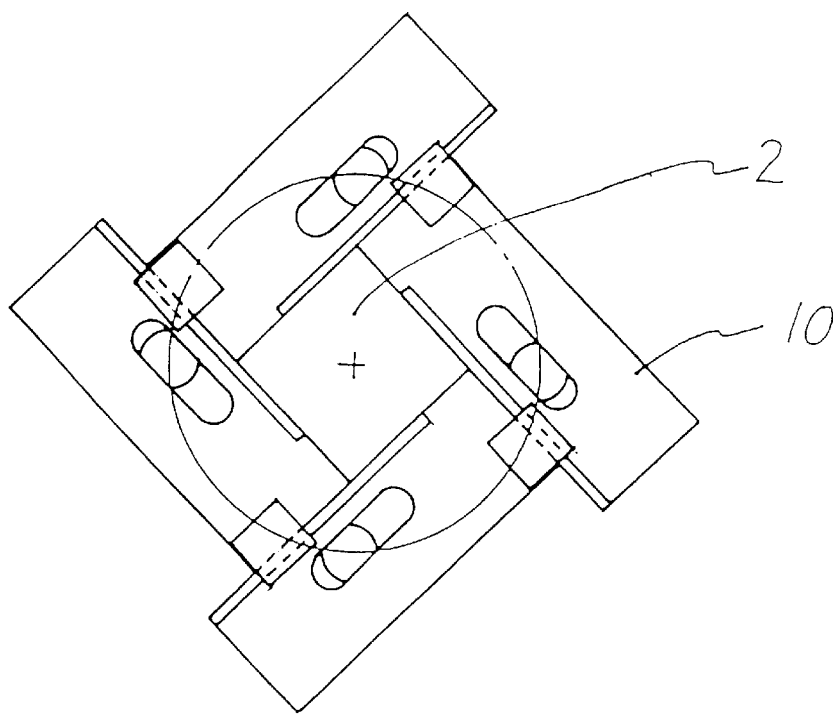
FIG. 11 is a plan view showing of the shutter assembly according to the second embodiment, wherein the central opening is further opened.
Figure 12:
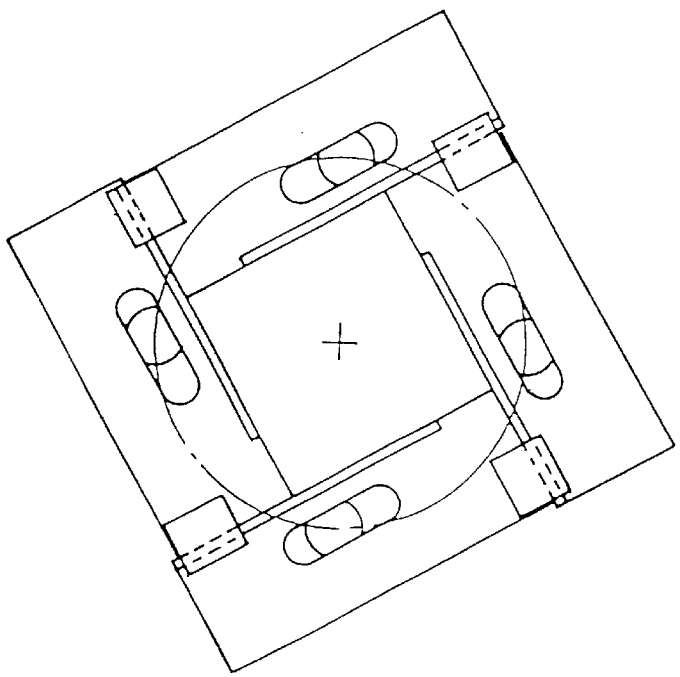
FIG. 12 is a plan view showing of the shutter assembly according to the second embodiment, wherein the central opening is fully opened.

FIG. 9 shows the shutter members 10 when the central opening 2 is closed. FIGS. 10–12 show positions of the shutter members 6 at various points while the central opening 2 is being opened.

Figure 13:
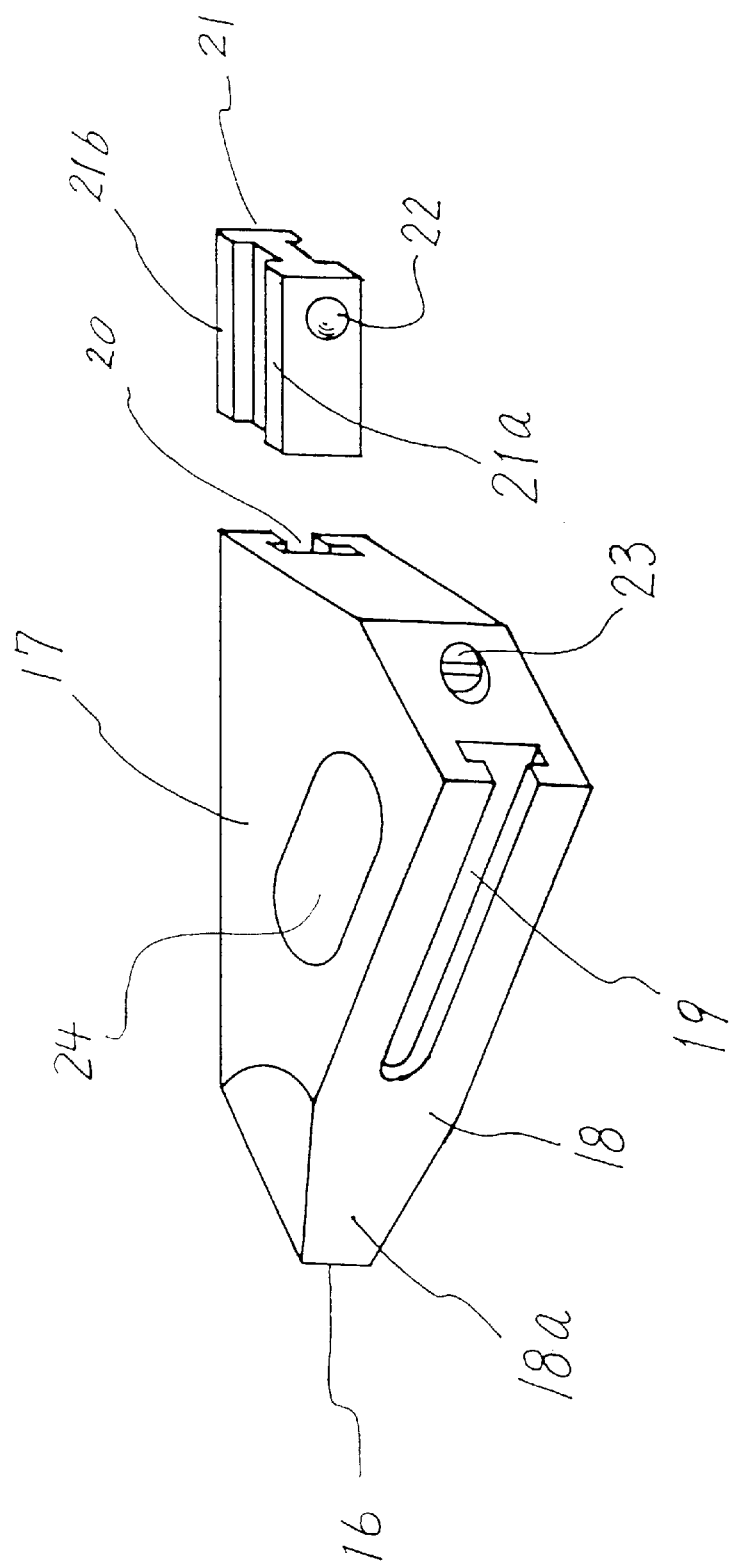
FIG. 13 is a perspective view showing a shutter member according to a third embodiment of the present invention.

FIG. 13 shows a shutter member 17 according to a third embodiment of the present invention.

The shutter member 17 of the third embodiment includes a sliding surface 18a which has a tapered pressing portion 18 whose thickness gradually decreases toward the tip 16 for pressing the outer surface of bar-shaped food material. A first T-shaped groove (engaging ridge) 19 is provided in a portion of the sliding surface 18 away from the pressing portion 18a. A second groove 20 is correspondingly provided in an opposing side sliding surface. An T-shaped engaging part 21a of a connecting member 21 is engaged with the groove 20 and fixed to a rear part of the shutter member 17 with a screw 23 which is received in a hole 22 provided in the engaging part 21a. Another engaging part 21b of the connecting member 21 is engaged with the groove 19 of an adjacent shutter member 17.

The shutter members 17 are thus assembled into a shutter assembly. The shutter members are then fit on shafts (not shown) through their respective elongated holes 24 to be rotated to cut and shape bar-shaped food material.

The third embodiment shown in FIG. 13 differs from the first embodiment shown in FIG. 8 in that the third embodiment does not include a connecting member which is exposed on the outside of the shutter assembly when the shutter members are assembled, so that a compact assembly is possible.

In the above embodiments, shafts are pivoted on fulcrums B equidistantly disposed on an imaginary circle to drive respective shutters. However, there is no need for the embodiments to be so limited. In one alternative embodiment, one shaft pivoted on a fulcrum may be enough to drive all the shutter members. In this case the drive shafts 37a mounted on the rotary shafts 37 merely serve as a driven shaft. Also, when driven shafts are used, it is not necessary to utilize elongated shafts for engaging the elongated holes. Thus, the shaft 37 need not rotate, but may be fit in the elongated hole of a shutter member so that it merely serves as a fulcrum.

In another alternative embodiment of the drive mechanism 3, the motor 4 may be one having a control function such as a servo motor. The amount of the crust to be guided by the shutter assembly during the cutting and shaping operation of bar-shaped food material can be adjusted by controlling the rotational speed, rotational angle, and rotational direction of the motor, so that the thickness of the crust at various points can be adjusted and products of various shapes can be cut and shaped.

As described above, the present invention has the following effects:

Because the present invention does not require a housing to hold an assembly of polyhedral members, the shutter assembly is not be clogged even when the shutter members are expanded by heat generated during the cutting and shaping operation.

Also, because the side surfaces of adjacent polyhedral members always slidingly abut each other so as to eliminate any gap formed therebetween, no food material will enter any gap formed in a conventional shutter assembly between the side surfaces of the polyhedral members. Thus, food products free from disfigured surfaces can be produced.

Finally, because the shutter assembly of the present invention is not clogged by heat during the operation, as is inevitable in the conventional apparatus, it can be continuously operated for a long time.

What is claimed is:

1. An apparatus for cutting and shaping a spherical body from a bar-shaped dough material, comprising:

a plurality of shutter members, each shutter member having first and second sliding surfaces meeting at a tip, and an elongated hole provided in a central part of the shutter member, and a plurality of shafts equidistantly disposed on an imaginary circle to be fit in each elongated hole, for driving each shutter member, wherein the first sliding surface of each shutter member slidably tracks the second sliding surface of an adjacent shutter member such that the first sliding surfaces form a central opening which is opened and closed by rotation of the plurality of shafts to cut and shape the bar-shaped dough material passing through the central opening, and wherein each shutter member includes a connecting member, laid across adjacent shutter members, for connecting adjacent shutter members such that the first sliding surface of the shutter member slidably contacts the second sliding surface of the adjacent shutter member to form a shutter assembly.

2. An apparatus of claim 1, wherein the first sliding surface of each shutter member is a convex sliding surface, and the second sliding surface of each shutter member is a concave sliding surface such that a convex-concave engagement results between adjacent shutter members.

3. An apparatus of claim 1, wherein the connecting member of each shutter member includes a body portion and a key-shaped portion, the body portion being fixed to said each shutter member, while the key-shaped portion slidingly engages a groove formed in an adjacent shutter member.

4. An apparatus of claim 1, wherein the elongated hole of each shutter member has a longitudinal axis which is parallel to the first sliding surface of said each shutter member.

5. An apparatus of claim 4, wherein each shaft includes a rotary shaft portion rotatably mounted to a driving mechanism, and a drive shaft portion fixedly mounted to the rotary shaft portion which is fitted into the elongated hole such that the drive shaft portion is slidable along the longitudinal axis of the elongated hole.

6. An apparatus of claim 1 wherein each shaft includes a drive shaft fixedly mounted to the shaft such that the drive shaft is slidable along the longitudinal axis of the elongated hole.

7. An apparatus of claim 6, wherein at least one of the shafts is a drive shaft for rotating the shutter members.

* * * * *

UNITED STATES PATENT AND TRADEMARK OFFICE
CERTIFICATE OF CORRECTION

PATENT NO. : 5,967,025
DATED : October 19, 1999
INVENTOR(S) : Yasunori Tashiro

It is certified that error appears in the above-identified patent and that said Letters Patent is hereby corrected as shown below:

On the Title Page

In column 2, line 1, please change "Taashiro" to --Tashiro--.

In column 2, line 7, under "ABSTRACT", please change "elonagated" to --elongated--.

Signed and Sealed this

Twelfth Day of September, 2000

Attest:

Q. TODD DICKINSON

Attesting Officer

Director of Patents and Trademarks